(12) United States Patent
Teramoto et al.

(10) Patent No.: US 10,962,110 B2
(45) Date of Patent: Mar. 30, 2021

(54) ROAD MACHINE

(71) Applicant: SUMITOMO(S.H.I.) CONSTRUCTION MACHINERY CO., LTD., Tokyo (JP)

(72) Inventors: Tota Teramoto, Chiba (JP); Hisaho Mino, Chiba (JP)

(73) Assignee: SUMITOMO(S.H.I.) CONSTRUCTION MACHINERY CO., LTD., Tokyo (JP)

( * ) Notice: Subject to any disclaimer, the term of this patent is extended or adjusted under 35 U.S.C. 154(b) by 237 days.

(21) Appl. No.: 15/868,137

(22) Filed: Jan. 11, 2018

(65) Prior Publication Data
US 2018/0134297 A1 May 17, 2018

Related U.S. Application Data

(63) Continuation of application No. PCT/JP2016/070579, filed on Jul. 12, 2016.

(30) Foreign Application Priority Data

Jul. 13, 2015 (JP) .............................. JP2015-139989

(51) Int. Cl.
*F16H 61/4008* (2010.01)
*F16H 61/4035* (2010.01)

(52) U.S. Cl.
CPC ..... *F16H 61/4035* (2013.01); *F16H 61/4008* (2013.01)

(58) Field of Classification Search
CPC ............... B60W 10/103; B60W 10/18; B60W 30/18118; E01C 19/48; F16H 61/4008; F16H 61/4035; F16H 61/4157
See application file for complete search history.

(56) References Cited

U.S. PATENT DOCUMENTS

| | | | | | |
|---|---|---|---|---|---|
| 5,489,007 | A | * | 2/1996 | Yesel | B60K 23/08 180/243 |
| 6,135,920 | A | * | 10/2000 | Kamiya | B60W 10/06 477/185 |

(Continued)

FOREIGN PATENT DOCUMENTS

| | | |
|---|---|---|
| DE | 102013202385 | 8/2014 |
| JP | H09-003820 | 1/1997 |

(Continued)

OTHER PUBLICATIONS

English translation of JP 2005147275 (Original FP document provided by applicant. English translation by Google, via WIPO document search. Retrived Oct. 1, 19 from: https://patentscope.wipo.int/).*

(Continued)

*Primary Examiner* — F Daniel Lopez
(74) *Attorney, Agent, or Firm* — IPUSA, PLLC

(57) ABSTRACT

A road machine includes a travel switch to cause the road machine to start traveling, a hydrostatic transmission including a traveling hydraulic pump and a traveling hydraulic motor, a pump regulator to control the discharge quantity of the traveling hydraulic pump; and a controller to control the pump regulator using a pump command current. The pump regulator increases the discharge quantity of the traveling hydraulic pump as the pump command current increases, and the controller increases the pump command current to a predetermined value smaller than a maximum current value in response to the travel switch being turned ON. Alternatively, the pump regulator increases the discharge quantity of the traveling hydraulic pump as the pump command current decreases, and the controller decreases the pump command current to a predetermined value greater than a minimum (Continued)

current value in response to the travel switch being turned ON.

7 Claims, 5 Drawing Sheets

(56) References Cited

U.S. PATENT DOCUMENTS

| | | | | |
|---|---|---|---|---|
| 7,353,105 | B2* | 4/2008 | Mino | F02D 31/007 |
| | | | | 123/350 |
| 7,854,182 | B2* | 12/2010 | Nakatani | B60W 10/103 |
| | | | | 180/367 |
| 8,333,069 | B2* | 12/2012 | Heren | F16H 61/444 |
| | | | | 60/484 |
| 8,701,818 | B2* | 4/2014 | Shirao | E02F 9/22 |
| | | | | 180/305 |
| 8,844,279 | B2* | 9/2014 | Nelson | F16H 61/438 |
| | | | | 60/456 |
| 8,855,871 | B2* | 10/2014 | Onodera | F16H 61/421 |
| | | | | 60/449 |
| 9,120,658 | B2* | 9/2015 | Kaneko | B66F 9/22 |
| 2006/0230920 | A1* | 10/2006 | Berg | B60K 31/10 |
| | | | | 91/499 |
| 2008/0209903 | A1* | 9/2008 | Itoga | B62D 5/07 |
| | | | | 60/471 |
| 2008/0254939 | A1* | 10/2008 | Ichimura | E02F 9/2246 |
| | | | | 477/107 |
| 2009/0320462 | A1* | 12/2009 | Ohtsukasa | E02F 9/2235 |
| | | | | 60/431 |
| 2010/0219026 | A1* | 9/2010 | Fukasawa | B60T 8/36 |
| | | | | 188/72.1 |
| 2011/0277459 | A1 | 11/2011 | Loritz et al. | |
| 2012/0330524 | A1* | 12/2012 | Rahman | B60T 7/042 |
| | | | | 701/70 |
| 2013/0033097 | A1* | 2/2013 | Biller | B60T 7/042 |
| | | | | 303/6.01 |
| 2013/0238210 | A1 | 9/2013 | Frelich et al. | |
| 2015/0158492 | A1* | 6/2015 | Bulgrien | B60W 10/02 |
| | | | | 701/53 |

FOREIGN PATENT DOCUMENTS

| | | |
|---|---|---|
| JP | 2002-039374 | 2/2002 |
| JP | 2005-147275 | 6/2005 |
| JP | 2006-009272 | 1/2006 |
| JP | 2009-083783 | 4/2009 |
| JP | 2013-023811 | 2/2013 |

OTHER PUBLICATIONS

International Search Report for PCT/JP2016/070579 dated Oct. 11, 2016.

* cited by examiner

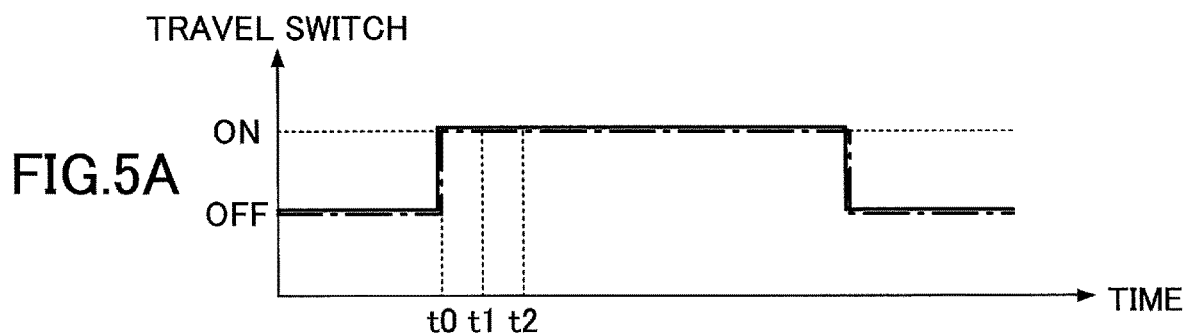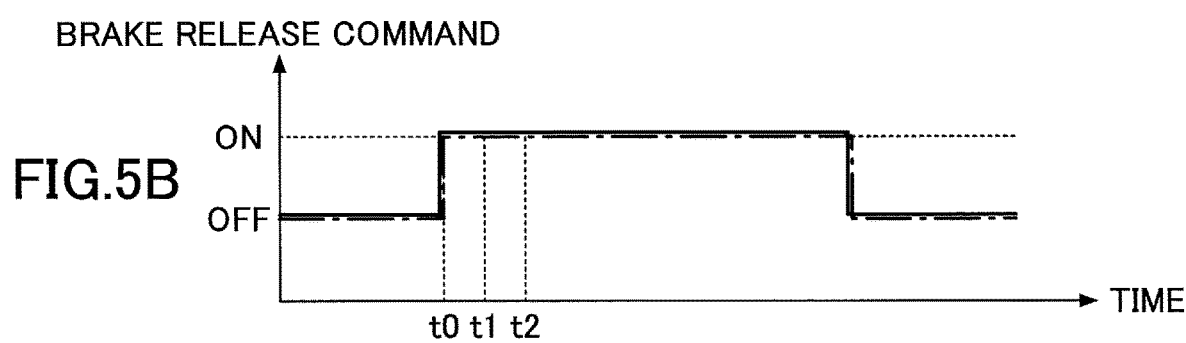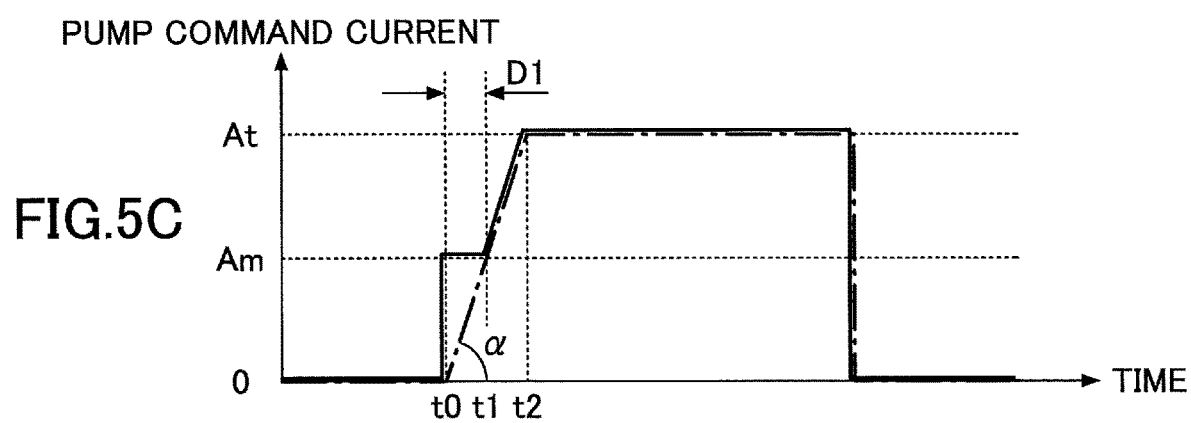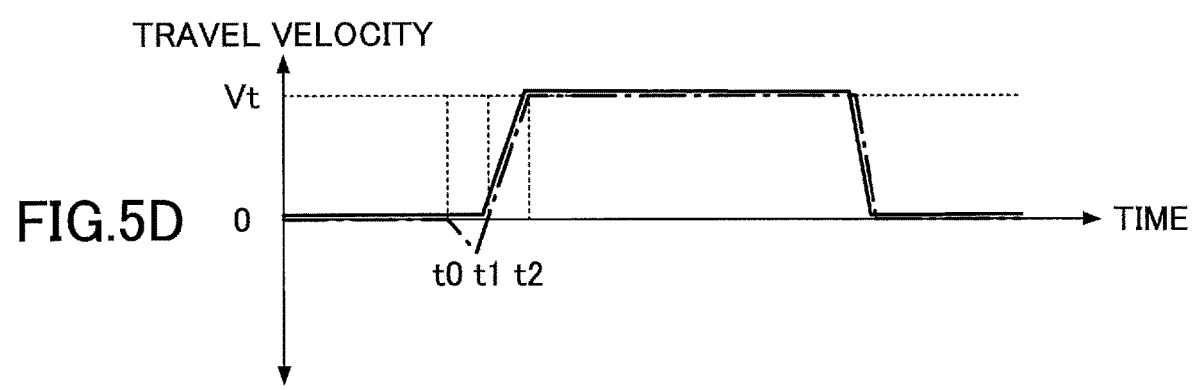

ROAD MACHINE

CROSS-REFERENCE TO RELATED APPLICATIONS

The present application is a continuation application filed under 35 U.S.C. 111(a) claiming benefit under 35 U.S.C. 120 and 365(c) of PCT International Application No. PCT/JP2016/070579, filed on Jul. 12, 2016 and designating the U.S., which claims priority to Japanese Patent Application No. 2015-139989, filed on Jul. 13, 2015. The entire contents of the foregoing applications are incorporated herein by reference.

BACKGROUND

Technical Field

The present invention relates to road machines with a traveling hydraulic circuit in which a hydrostatic transmission (HST) is adopted.

Description of Related Art

An asphalt finisher with a hill backward rolling prevention control circuit for preventing backward rolling at a hill start on a steep hill is known.

This asphalt finisher includes an HST formed of a single hydraulic pump and two hydraulic motors, an angle sensor configured to detect the inclination of the vehicle body in its front-rear direction, and a controller. Traveling wheels are connected one to each hydraulic motor through a speed reducer. The controller controls the discharge quantity of the hydraulic pump through a tilt regulator, controls the absorption quantity of the hydraulic motors through other tilt regulators, and controls the reduction ratio of the speed reducers through solenoid-operated directional control valves. In response to determining that the asphalt finisher is positioned on a steep uphill at the time of not working but moving and traveling, the controller increases the absorption quantity of the hydraulic motors and increases the reduction ratio of the speed reducers and thereafter gradually increases the discharge quantity of the hydraulic pump to gradually increase the rotational speed of the traveling wheels.

SUMMARY

According to an aspect of the present invention, a road machine includes a travel switch configured to cause the road machine to start traveling, a hydrostatic transmission including a traveling hydraulic pump and a traveling hydraulic motor, a pump regulator configured to control the discharge quantity of the traveling hydraulic pump, and a controller configured to control the pump regulator using a pump command current. The pump regulator is configured to increase the discharge quantity of the traveling hydraulic pump as the current value of the pump command current increases, and the controller is configured to increase the current value of the pump command current to a predetermined value smaller than a maximum current value in response to the travel switch being turned ON. Alternatively, the pump regulator is configured to increase the discharge quantity of the traveling hydraulic pump as the current value of the pump command current decreases, and the controller is configured to decrease the current value of the pump command current to a predetermined value greater than a minimum current value in response to the travel switch being turned ON.

BRIEF DESCRIPTION OF THE DRAWINGS

FIGS. 5A through 5D are graphs illustrating a temporal transition of various physical quantities related to the travel control process.

DETAILED DESCRIPTION

Related art, however, is silent with respect to the temporal relationship between the timing of releasing the brake on the traveling wheels and the timing of starting the above-described gradual increase in the discharge quantity of the hydraulic pump. Therefore, in the case where the brake is released when the discharge quantity of the hydraulic pump is small, it may be impossible to prevent backward rolling at a hill start even when the absorption quantity of the hydraulic motors and the reduction ratio of the speed reducers are increased.

In view of the above, it is desired to provide a road machine that more reliably prevents backward rolling at a hill start.

According to an aspect of the present invention, a road machine that more reliably prevents backward rolling at a hill start is provided.

Figure 1:
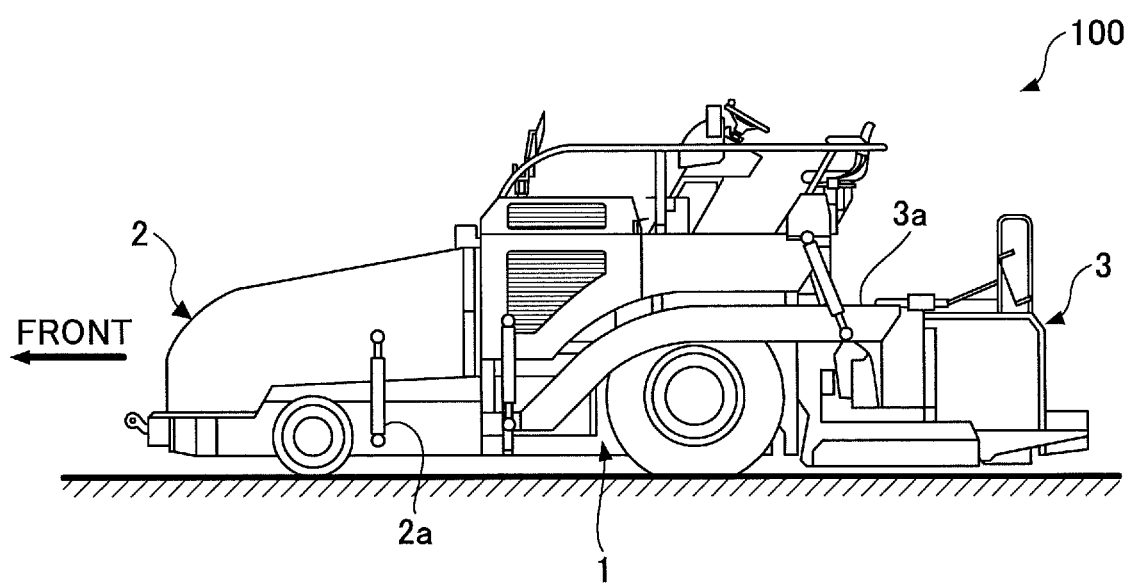
FIG. 1 is a side view of an asphalt finisher according to an embodiment of the present invention.

FIG. 1 is a side view of an asphalt finisher 100 that is an example of a road machine according to an embodiment of the present invention. The asphalt finisher 100 includes a tractor 1, a hopper 2, and a screed unit 3 as main components.

The tractor 1 is a mechanism for causing the asphalt finisher 100 to travel. According to this embodiment, the tractor 1 rotates front wheels and rear wheels using traveling hydraulic motors to move the asphalt finisher 100. The traveling hydraulic motors are supplied with hydraulic oil from a hydraulic source to rotate.

The hopper 2 is a mechanism for receiving a paving material. According to this embodiment, the hopper 2 is configured to be openable and closable in the directions of the vehicle width through hopper cylinders 2a. The asphalt finisher 100 normally fully opens the hopper 2 to receive a paving material (such as an asphalt mixture) from the bed of a dump truck. The paving material received into the hopper 2 is fed to the screed unit 3, using a conveyor and a screw.

The screed unit 3 is a mechanism for evenly spreading the paving material. According to this embodiment, the screed unit 3 is a floating screed unit towed by the tractor 1, and is coupled to the tractor 1 through leveling arms 3a.

Figure 2:
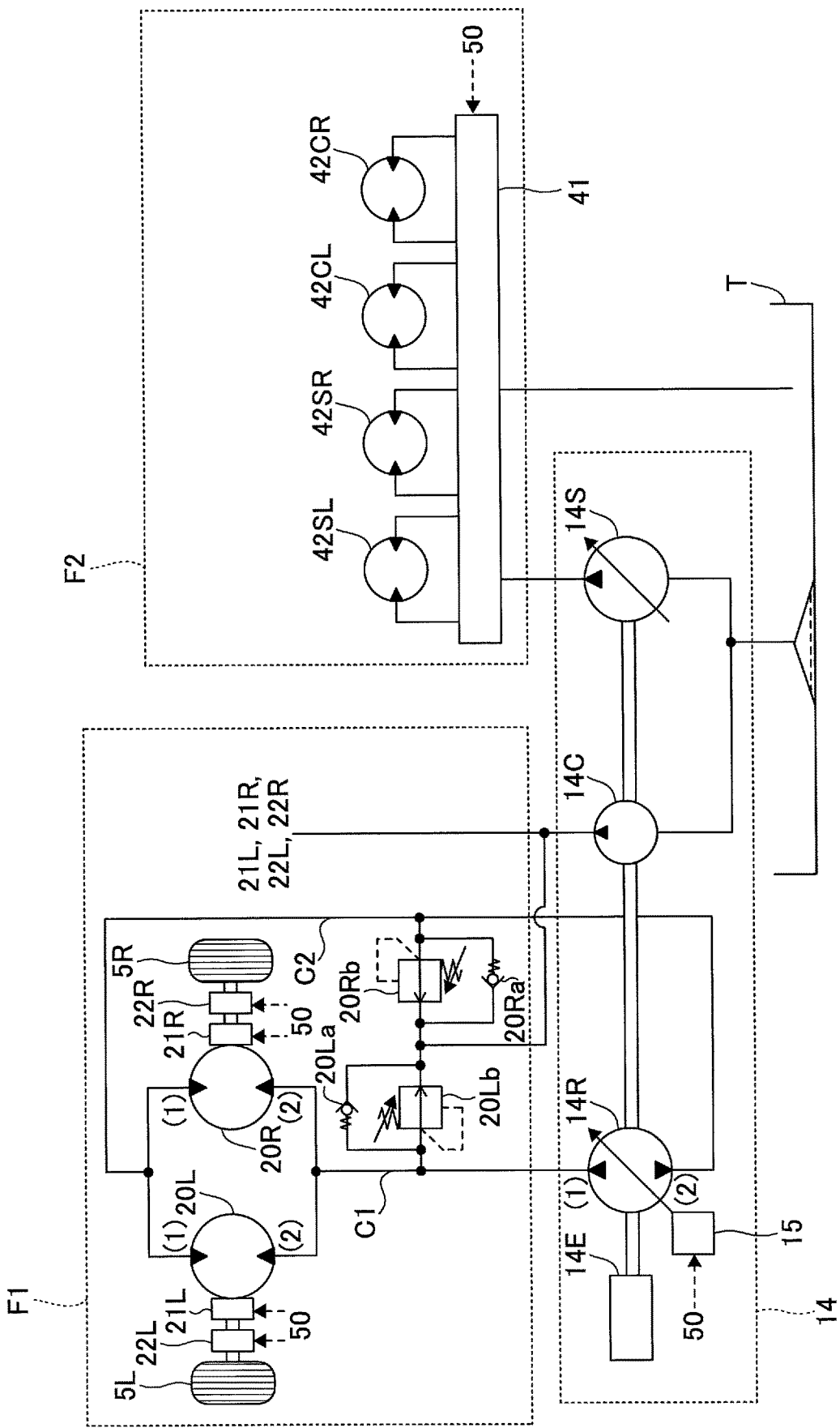
FIG. 2 is a hydraulic circuit diagram illustrating a configuration of a hydraulic system installed in the asphalt finisher of FIG. 1.

Next, a hydraulic system installed in the asphalt finisher 100 of FIG. 1 is described with reference to FIG. 2. FIG. 2 is a hydraulic circuit diagram illustrating a configuration of a hydraulic system installed in the asphalt finisher 100 of FIG. 1.

The hydraulic system mainly includes a hydraulic source 14, a rear wheel driving part F1, and a conveyor and screw driving part F2.

The hydraulic source 14 is a functional element to supply hydraulic oil for operating various hydraulic driving parts including the rear wheel driving part F1 and the conveyor and screw driving part F2. According to this embodiment, the hydraulic source 14 mainly includes an engine 14E, a rear wheel traveling pump 14R, a charge pump 14C, and a conveyor and screw pump 14S.

The engine 14E is a drive source to drive the rear wheel traveling pump 14R, the charge pump 14C, and the conveyor and screw pump 14S.

The rear wheel traveling pump 14R serving as a traveling hydraulic pump is a variable displacement hydraulic pump to supply the rear wheel driving part F1 with hydraulic oil for driving. According to this embodiment, the rear wheel traveling pump 14R is a swash-plate variable displacement bidirectional hydraulic pump used in a closed circuit (HST), and the discharge quantity of the rear wheel traveling pump 14R is controlled by a pump regulator 15. Technically, the discharge quantity is the quantity of discharge per pump revolution, and is also referred to as a geometric displacement.

The pump regulator 15 is a device to control the discharge quantity of the rear wheel traveling pump 14R. According to this embodiment, the pump regulator 15 controls the discharge quantity of the rear wheel traveling pump 14R in accordance with a pump command current from a controller 30. For example, the pump regulator 15 increases the discharge quantity of the rear wheel traveling pump 14R as the current value of the pump command current increases.

The charge pump 14C is a fixed displacement hydraulic pump to supply the rear wheel driving part F1 with hydraulic oil for controlling.

The conveyor and screw pump 14S is a variable displacement hydraulic pump to supply the conveyor and screw driving part F2 with hydraulic oil. According to this embodiment, the conveyor and screw pump 14S is a swash-plate variable displacement hydraulic pump.

The rear wheel driving part F1 is a functional element to drive rear wheels 5L and 5R. According to this embodiment, the rear wheel driving part F1 includes a left rear wheel traveling motor 20L, a right rear wheel traveling motor 20R, check valves 20La and 20Ra, relief valves 20Lb and 20Rb, reduction ratio controllers 21L and 21R, and brake controllers 22L and 22R.

The left rear wheel traveling motor 20L is a hydraulic motor to drive the left rear wheel 5L. The right rear wheel traveling motor 20R is a hydraulic motor to drive the right rear wheel 5R. According to this embodiment, the left rear wheel traveling motor 20L and the right rear wheel traveling motor 20R are variable displacement hydraulic motors, and form a closed circuit (HST) together with the rear wheel traveling pump 14R. The left rear wheel traveling motor 20L and the right rear wheel traveling motor 20R may alternatively be fixed displacement hydraulic motors.

The check valve 20La maintains the pressure of hydraulic oil inside a conduit C1 at or above a predetermined pressure, the conduit C1 connecting a first port of the rear wheel traveling pump 14R and respective second ports of the left rear wheel traveling motor 20L and the right rear wheel traveling motor 20R. Specifically, when the pressure of hydraulic oil inside the conduit C1 falls below the discharge pressure of the charge pump 14C, the check valve 20La causes the hydraulic oil discharged by the charge pump 14C to flow into the conduit C1. In the drawing, parenthesized numbers indicate port numbers. Likewise, the check valve 20Ra maintains the pressure of hydraulic oil inside a conduit C2 at or above a predetermined pressure, the conduit C2 connecting a second port of the rear wheel traveling pump 14R and respective first ports of the left rear wheel traveling motor 20L and the right rear wheel traveling motor 20R. Specifically, when the pressure of hydraulic oil inside the conduit C2 falls below the discharge pressure of the charge pump 14C, the check valve 20Ra causes the hydraulic oil discharged by the charge pump 14C to flow into the conduit C2.

The relief valve 20Lb maintains the pressure of hydraulic oil inside the conduit C1 below a predetermined relief pressure. Specifically, when the pressure of hydraulic oil inside the conduit C1 exceeds the relief pressure, the relief valve 20Lb causes the hydraulic oil inside the conduit C1 to flow out of the closed circuit. Likewise, the relief valve 20Rb maintains the pressure of hydraulic oil inside the conduit C2 below a predetermined relief pressure. Specifically, when the pressure of hydraulic oil inside the conduit C2 exceeds the relief pressure, the relief valve 20Rb causes the hydraulic oil inside the conduit C2 to flow out of the closed circuit.

The reduction ratio controller 21L is a device to control the reduction ratio of a speed reducer coupled to the left rear wheel traveling motor 20L. According to this embodiment, the reduction ratio controller 21L controls the reduction ratio of the speed reducer coupled to the left rear wheel traveling motor 20L, using the hydraulic oil discharged by the charge pump 14C, in response to a control command from the controller 30. The same is the case with the reduction ratio controller 21R that controls the reduction ratio of a speed reducer coupled to the right rear wheel traveling motor 20R.

The brake controller 22L is a device to control the braking force of a left rear wheel brake that brakes the left rear wheel 5L of the asphalt finisher 100. According to this embodiment, the brake controller 22L controls the braking force of the left rear wheel brake, using the hydraulic oil discharged by the charge pump 14C, in response to a control command from the controller 30. The same is the case with the brake controller 22R that controls the braking force of a right rear wheel brake.

The conveyor and screw driving part F2 is a functional element to drive a conveyor and a screw. According to this embodiment, the conveyor and screw driving part F2 mainly includes a left screw motor 42SL, a right screw motor 42SR, a left conveyor motor 42CL, a right conveyor motor 42CR, and a conveyor and screw valve 41.

Each of the left screw motor 42SL, the right screw motor 42SR, the left conveyor motor 42CL, and the right conveyor motor 42CR is a variable displacement hydraulic motor that forms an open circuit.

The conveyor and screw valve 41 includes a conveyor control valve and a screw control valve. The conveyor control valve switches in response to a control command from the controller 30, and causes the hydraulic oil discharged by the conveyor and screw pump 14S to flow into the intake port of at least one of the left conveyor motor 42CL and the right conveyor motor 42CR. Furthermore, the conveyor control valve discharges hydraulic oil flowing out of the discharge port of at least one of the left conveyor motor 42CL and the right conveyor motor 42CR to a hydraulic oil tank T. Likewise, the screw control valve switches in response to a control command from the controller 30, and causes the hydraulic oil discharged by the conveyor and screw pump 14S to flow into the intake port of at least one of the left screw motor 42SL and the right screw motor 42SR. Furthermore, the screw control valve discharges hydraulic oil flowing out of the discharge port of at least one of the left screw motor 42SL and the right screw motor 42SR to the hydraulic oil tank T.

Figure 3:
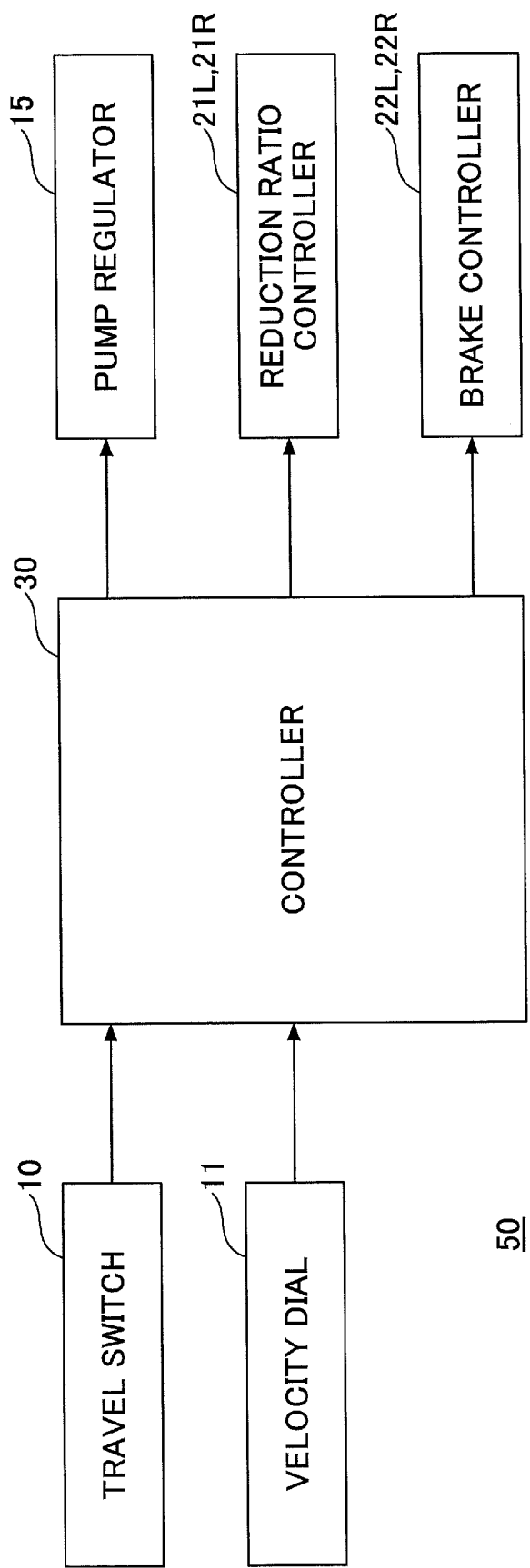
FIG. 3 is a schematic diagram illustrating a configuration of a travel control system installed in the asphalt finisher of FIG. 1.

Next, a travel control system 50 installed in the asphalt finisher 100 is described with reference to FIG. 3.

The travel control system 50 mainly includes a travel switch 10, a velocity dial 11, the controller 30, the pump regulator 15, the reduction ratio controllers 21L and 21R, and the brake controllers 22L and 22R.

The travel switch 10 is a switch for causing the asphalt finisher 100 to start traveling. According to this embodiment, the travel switch 10 is attached where the travel switch 10 is operable by an operator sitting in a cab installed on top of the tractor 1.

The velocity dial 11 is a dial for setting a target travel velocity for the asphalt finisher 100. According to this embodiment, like the travel switch 10, the velocity dial 11 is attached where the velocity dial 11 is operable by the operator sitting in the cab installed on top of the tractor 1.

The controller 30 is a control device to control the asphalt finisher 100. According to this embodiment, the controller 30 is composed of a processing unit including a CPU and an internal memory. The CPU executes a program stored in the internal memory to implement various functions of the controller 30.

The asphalt finisher 100 positioned on a slope moves backward when a forward rotation torque to rotate the rear wheel traveling motors 20L and 20R forward is smaller than a reverse rotation torque when the rear wheel brakes are released. The forward rotation torque is generated based on the discharge pressure of the rear wheel traveling pump 14R, and the reverse rotation torque is generated based on the own weight of the asphalt finisher 100. Therefore, the asphalt finisher 100 is likely to move backward if the discharge quantity of the rear wheel traveling pump 14R is small when the asphalt finisher 100 starts to move.

Therefore, the controller 30 prevents the backward movement of the asphalt finisher 100 by increasing the discharge quantity of the rear wheel traveling pump 14R when the asphalt finisher 100 starts to move.

An excessive increase in the discharge quantity of the rear wheel traveling pump 14R at the start of movement, however, may cause a sudden start of the asphalt finisher 100. Furthermore, if there is a delay in releasing the brakes, the forward rotation torque by the rear wheel traveling pump 14R may act to cancel the braking torque by the brakes to damage the brakes. Accordingly, it is necessary to appropriately determine the size of an increase in the discharge quantity of the rear wheel traveling pump 14R at the start of movement and the timing of releasing the brakes.

Specifically, the controller 30 executes various operations based on the outputs of the travel switch 10 and the velocity dial 11, and outputs various control commands based on the results of the operations to the pump regulator 15, the reduction ratio controllers 21L and 21R, and the brake controllers 22L and 22R.

When the travel switch 10 is turned ON, the controller 30 obtains a target travel velocity Vt set by the velocity dial 11, and determines various parameters used for controlling the pump regulator 15. The various parameters include a movement start current value Am, a movement start time D1, a current value increase rate $\alpha$, a target current value At, etc.

The movement start current value Am is a current value at the time when the asphalt finisher 100 starts to move forward in the case of gradually increasing the current value of the pump command current to move the asphalt finisher 100 forward. For example, in the case where the asphalt finisher 100 positioned on a slope temporarily moves backward when starting to move, the movement start current value Am corresponds to a current value at the time when the asphalt finisher 100 returns to the initial position through a subsequent forward movement. The movement start current value Am may alternatively be a current value at the time when the backward movement stops.

The movement start time D1 is a time taken before the current value of the pump command current reaches the movement start current value Am after starting to gradually increase to move the asphalt finisher 100 positioned on a slope forward.

The movement start current value Am and the movement start time D1, which are values determined in accordance with the gradient of a slope, the type of a road machine, etc., may be prestored in the internal memory, input through an input device that is not depicted, or dynamically calculated based on the output of an angle sensor attached to the tractor 1 to detect the inclination of the vehicle body in its front-rear direction.

The current value increase rate $\alpha$ is the value obtained by dividing the movement start current value Am by the movement start time D1, and corresponds to the traveling acceleration of the asphalt finisher 100. That is, as the current value increase rate $\alpha$ increases, the traveling acceleration of the asphalt finisher 100 at the start of movement increases.

The target current value At is the current value of the pump command current corresponding to the target travel velocity Vt of the asphalt finisher 100 set by the velocity dial 11. Furthermore, the target current value At means a maximum current value employable as the pump command current unless the setting of the velocity dial 11 is changed. Furthermore, the movement start current value Am is smaller than the target current value At serving as a maximum current value. That is, the maximum current value is a current value corresponding to a maximum horsepower, and the movement start current value Am is a current value corresponding to a horsepower smaller than the maximum horsepower.

Figure 4:
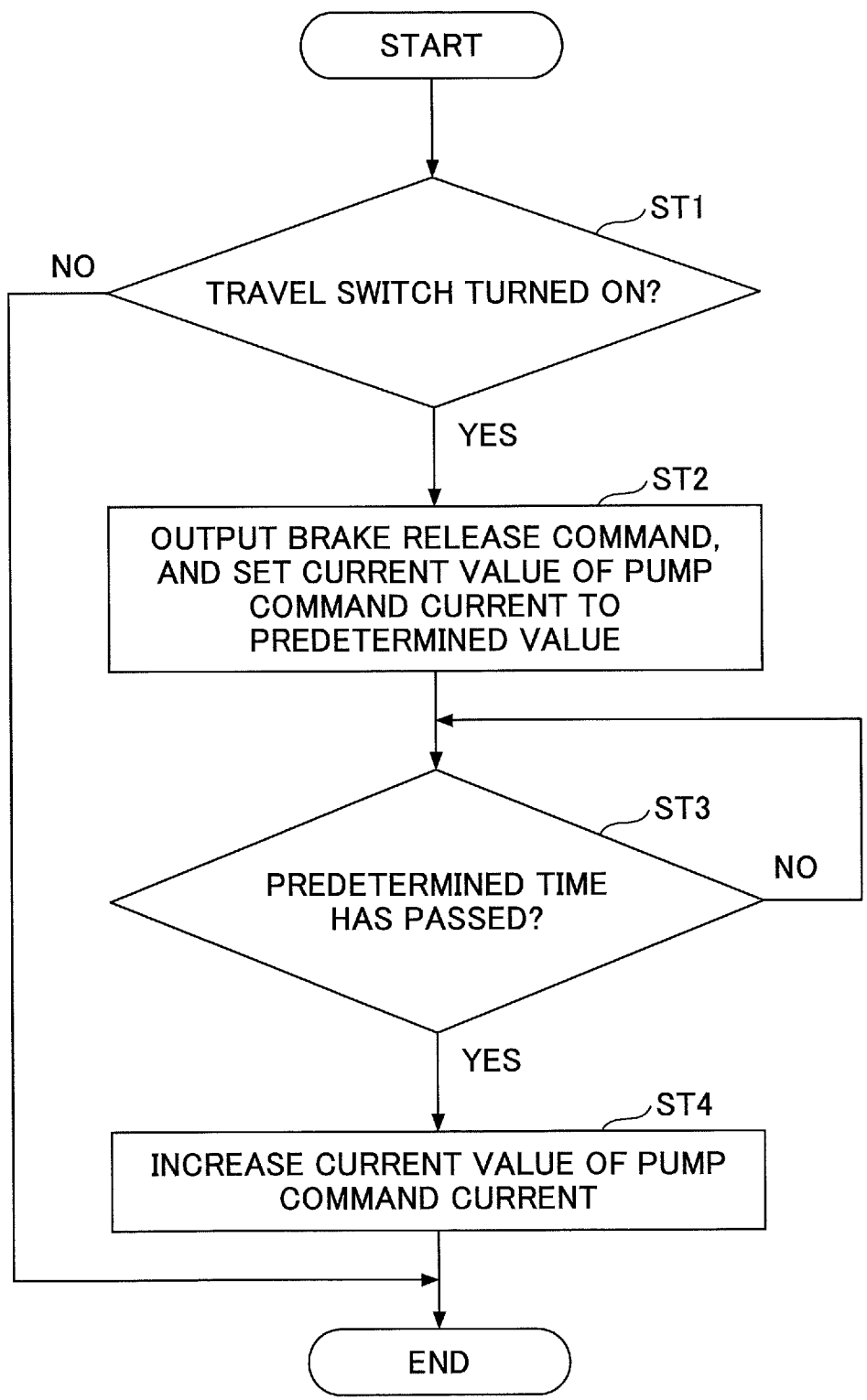
FIG. 4 is a flowchart of a travel control process.

Next, a process of controlling the traveling of the asphalt finisher 100 positioned on an uphill by the controller 30 (hereinafter referred to "travel control process") is described with reference to FIG. 4. FIG. 4 is a flowchart illustrating a travel control process. The controller 30 repeatedly executes this travel control process in a predetermined control cycle while the asphalt finisher 100 is in operation.

First, the controller 30 determines whether the travel switch 10 is turned ON (step ST1).

In response to determining that the travel switch 10 is not turned ON (NO at step ST1), the controller 30 ends a current travel control process.

In response to determining that the travel switch 10 is turned ON (YES at step ST1), the controller 30 outputs a brake release command to the brake controllers 22L and 22R, and at the same time, sets the current value of the pump command current to output to the pump regulator 15 to a predetermined value (the movement start current value Am) (step ST2).

Furthermore, the controller 30 may start driving the left screw motor 42SL, the right screw motor 42SR, the left conveyor motor 42CL, and the right conveyor motor 42CR in response to the travel switch 10 being turned ON.

Thereafter, the controller 30 determines whether a predetermined time (the movement start time D1) has passed since the travel switch 10 is turned ON (step ST3).

In response to determining that the movement start time D1 has not passed (NO at step ST3), the controller 30 repeats the determination of step ST3 until the movement start time D1 passes.

In response to determining that the movement start time D1 has passed (YES at step ST3), the controller 30 increases the current value of the pump command current (step ST4). According to this embodiment, the controller 30 increases the current value of the pump command current to a predetermined maximum current value (the target current value At) at a predetermined increase rate (the current value increase rate $\alpha$). The current value increase rate $\alpha$ is a value determined by the movement start current value Am and the movement start time D1, and the target current value At is a value determined by the target travel velocity Vt set by the velocity dial 11.

Next, a temporal transition of various physical quantities related to the travel control process is described with reference to FIGS. 5A through 5D. The various physical quantities are the output state of the travel switch 10 illustrated in FIG. 5A, the output state of the brake release command illustrated in FIG. 5B, the current value of the pump command current illustrated in FIG. 5C, and the travel velocity of the asphalt finisher 100 illustrated in FIG. 5D. The solid line of FIGS. 5A through 5D indicates a temporal transition in the case where the travel control process is executed to increase the pump command current stepwise to the movement start current value Am. The one-dot chain line of FIGS. 5A through 5D indicates a temporal transition in the case where the travel control process is not executed to gradually increase the pump command current.

Specifically, as illustrated in FIG. 5A, when the travel switch 10 is turned ON at time t0, the output state of the travel switch 10 becomes ON level. Furthermore, as illustrated in FIG. 5B, the output state of the brake release command as well becomes ON level.

Furthermore, as illustrated in FIG. 5C, the pump command current increases stepwise to the movement start current value Am at time t0. This makes it possible to sharply increase the discharge horsepower of the rear wheel traveling pump 14R to a predetermined value. As a result, as illustrated in FIG. 5D, the travel speed of the asphalt finisher 100 starts to increase at time t1, and reaches the target travel velocity Vt at time t2. That is, the asphalt finisher 100 can move forward to move up a hill without moving backward at the start of movement.

In contrast, in the case where the travel control process is not executed, for example, as indicated by the one-dot chain line of FIG. 5C, the pump command current starts to gradually increase at the current value increase rate $\alpha$ at time t0 and reaches the movement start current value Am at time t1. As a result, as indicated by the one-dot chain line of FIG. 5D, the travel velocity of the asphalt finisher 100 starts to fall to the negative side (backward movement side) at time t0. Then, after temporarily swinging to the negative side, the travel velocity of the asphalt finisher 100 starts to increase to the positive side (forward movement side) to return to a value 0 at time t1, and reaches the target travel velocity Vt at time t2. That is, the asphalt finisher 100 temporarily moves backward when starting to move, and thereafter, starts to move forward. The time between time t0 and time t1 corresponds to the time required for the pump command current to reach the movement start current value Am after starting to move from the value 0 (the movement start time D1).

Thus, the controller 30 increases the discharge quantity of the rear wheel traveling pump 14R at the start of movement earlier. Therefore, the controller 30 increases the discharge pressure of the rear wheel traveling pump 14R and thus a forward rotation torque to rotate the rear wheel traveling motors 20L and 20R forward at an earlier point, and causes the forward rotation torque to be greater than a reverse rotation torque due to the own weight of the asphalt finisher 100. As a result, it is possible to prevent the asphalt finisher 100 positioned on an uphill from moving backward when starting the asphalt finisher 100 moving forward. Furthermore, it is possible to cause the asphalt finisher 100 to smoothly start traveling to prevent the degradation of the quality of a work surface.

A preferred embodiment of the present invention is described above. The present invention, however, is not limited to the above-described embodiment, and various modifications and replacements may be made to the above-described embodiment without departing from the scope of the present invention.

For example, according to the above-describe embodiment, the timing of increasing the current value of the pump command current stepwise to the movement start current value Am and the timing of outputting the brake release command are simultaneous. The timing of outputting the brake release command, however, may be later than the timing of increasing the pump command current. This is for more reliably causing the intake-side pressure of hydraulic oil of the rear wheel traveling motors 20L and 20R to be greater than or equal to a predetermined pressure before the brakes are completely released, namely, for more reliably causing a forward rotation torque by the rear wheel traveling pump 14R to be greater than a reverse rotation torque before the brakes are completely released. There is a time difference between the timing of the output of the brake release command and the timing of the actual complete release of braking by the brakes. Therefore, the temporal relationship between the timing of increasing the pump command current and the timing of outputting the brake release command may be determined in consideration of this time difference. For example, if the time difference is significant, the timing of outputting the brake release command may be earlier than the timing of increasing the pump command current.

Furthermore, FIG. 5C illustrates an example of control in the case of using the pump regulator 15 structured to increase the discharge quantity of the rear wheel traveling pump 14R as the current value of the pump command current increases. The present invention, however, is not limited to this configuration. For example, a pump regulator structured to increase the discharge quantity of the rear wheel traveling pump 14R as the current value of the pump command current decreases may alternatively be used. In this case, the controller 30 increases the pump command current toward a maximum current value corresponding to a minimum horsepower when it is desired to decrease the discharge quantity, and decreases the pump command current toward a minimum current value corresponding to a maximum horsepower when it is desired to increase the discharge quantity. Then, the controller 30 decreases the current value of the pump command current stepwise to the movement start current value Am (a predetermined value greater than the minimum current value) in response to the travel switch 10 being turned ON. That is, the minimum current value is a current value corresponding to the maximum horsepower, and the movement start current value Am is a current value corresponding to a horsepower smaller than the maximum horsepower.

What is claimed is:

1. An asphalt finisher comprising:
   a travel switch configured to cause the asphalt finisher to start traveling;
   a hydrostatic transmission including a traveling hydraulic pump and a traveling hydraulic motor;
   a pump regulator configured to control a discharge quantity of the traveling hydraulic pump; and
   a controller configured to control the pump regulator using a pump command current,
   wherein the pump regulator is configured to increase the discharge quantity of the traveling hydraulic pump as a current value of the pump command current increases, and the controller is configured to increase, independently of a target travel velocity, the current value of the pump command current to a predetermined value smaller than a maximum current value in response to the travel switch being turned ON, or
   the pump regulator is configured to increase the discharge quantity of the traveling hydraulic pump as the current value of the pump command current decreases, and the controller is configured to decrease, independently of the target travel velocity, the current value of the pump command current to a predetermined value greater than a minimum current value in response to the travel switch being turned ON, and
   wherein the predetermined value is a current value at a time when the asphalt finisher at least stops a backward movement on a slope.

2. The asphalt finisher as claimed in claim 1, further comprising:
   a brake controller configured to control a brake configured to brake the asphalt finisher,
   wherein the controller is configured to simultaneously cause the current value of the pump command current to be the predetermined value, and
   output a brake release command to the brake controller to release braking by the brake.

3. The asphalt finisher as claimed in claim 2, wherein
   the traveling hydraulic motor includes a plurality of traveling hydraulic motors,
   the brake includes a plurality of brakes that are provided one for each of the plurality of traveling hydraulic motors.

4. The asphalt finisher as claimed in claim 1, further comprising:
   a hydraulic driving part other than the traveling hydraulic pump,
   wherein the controller is configured to start driving the hydraulic driving part in response to the travel switch being turned ON.

5. The asphalt finisher as claimed in claim 1, wherein
   the traveling hydraulic motor includes a plurality of traveling hydraulic motors, and
   the traveling hydraulic pump is configured to supply hydraulic oil to the plurality of traveling hydraulic motors.

6. The asphalt finisher as claimed in claim 1, wherein the controller is configured to change the current value of the pump command current stepwise in response to the travel switch being turned ON.

7. An asphalt finisher comprising:
   a travel switch configured to cause the asphalt finisher to start traveling;
   a right rear wheel brake and a left rear wheel brake configured to brake the asphalt finisher;
   a hydrostatic transmission including a traveling hydraulic pump, a right rear wheel traveling motor, and a left rear wheel traveling motor; and
   a controller configured to control releasing of the right rear wheel brake and the left rear wheel brake and a discharge quantity of the traveling hydraulic pump,
   wherein the controller is configured to increase an intake-side pressure of hydraulic oil of the right rear wheel traveling motor and the left rear wheel traveling motor to a predetermined pressure before the right rear wheel brake and the left rear wheel brake are simultaneously released,
   wherein the controller is configured to control the discharge quantity of the traveling hydraulic pump using a pump command current, and
   wherein the controller is configured to change a current value of the pump command current stepwise to a current value corresponding to a horsepower smaller than a maximum horsepower, in response to the travel switch being turned ON.

* * * * *